United States Patent [19]

Paul

[11] Patent Number: 4,643,659
[45] Date of Patent: Feb. 17, 1987

[54] APPARATUS FOR PRODUCING, BY EXTRUSION, FLAT PROFILED ARTICLES OF PLASTIC MIXTURES OF VARIOUS COMPOSITION

[75] Inventor: Helmut Paul, Sarreguemines, France

[73] Assignee: Continental Gummi-Werke Aktiengesellschaft, Hanover, Fed. Rep. of Germany

[21] Appl. No.: 713,773

[22] Filed: Mar. 19, 1985

[30] Foreign Application Priority Data

Mar. 22, 1984 [DE] Fed. Rep. of Germany ....... 3410535

[51] Int. Cl.[4] ............................................. B29C 47/06
[52] U.S. Cl. .................................. 425/131.1; 264/171; 425/133.5; 425/190; 425/462
[58] Field of Search ...................... 425/113, 114, 131.1, 425/133.5, 132, 381, 186, 188, 190, 192 R, 462, 463, 461; 264/171, 245

[56] References Cited

U.S. PATENT DOCUMENTS

| | | | |
|---|---|---|---|
| 2,227,263 | 12/1940 | Knowles | 425/190 |
| 3,981,655 | 9/1976 | Horbach | 425/190 |
| 4,204,496 | 5/1980 | Ikegami et al. | 425/381 |
| 4,280,801 | 7/1981 | Wheeler, Jr. et al. | 425/192 R |
| 4,358,261 | 11/1982 | Ohki | 425/131.1 |
| 4,548,568 | 10/1985 | Herbert et al. | 425/131.1 |
| 4,552,521 | 11/1985 | Linnstaedter | 425/131.1 |

Primary Examiner—Jay H. Woo
Assistant Examiner—J. Fortenberry
Attorney, Agent, or Firm—Becker & Becker, Inc.

[57] ABSTRACT

To extrude, for pneumatic tires, uncured tread strips composed of three different rubber or synthetic material mixtures, three extruders are used which feed to a common extruder head and are connected with the latter. The present invention utilizes the favorable flow conditions resulting from the known Y-arrangement of three extruders within the extruder head, while at the same time avoiding the previously unavoidable complex and expensive specialized construction of the extruder head. Inventively, the third extruder, which opposes the two first extruders in the withdrawal direction, is not screwed or clamped to the extruder head which is common to all three of the extruders. Rather, the third extruder is easily detachably connected via a direct metal-to-metal contact with the extruder head only by a frictional connection in a longitudinally movable arrangement.

5 Claims, 3 Drawing Figures

APPARATUS FOR PRODUCING, BY EXTRUSION, FLAT PROFILED ARTICLES OF PLASTIC MIXTURES OF VARIOUS COMPOSITION

BACKGROUND OF THE INVENTION

1. Field of the Invention

An apparatus for producing, by extrusion, flat profiled articles of plastic mixtures of various compositions of rubber or synthetic material, especially for producing uncured tread strips for pneumatic tires having a dual-layer central portion, and two identical edge portions; the apparatus has two first extruders, which are disposed at an acute angle above or next to one another and convey material to a common extrusion nozzle, and one third extruder, which is placed on the common extrusion nozzle and conveys material thereto counter to the direction in which the profiled articles are withdrawn from the apparatus.

2. Description of the Prior Art

It is known to produce multi-layer profiled articles by combining the partial flows of differing mixtures coming from several individual extruders in a common nozzle simultaneously with the shaping or immediately prior thereto, and to extrude the unit as a continuous, uniform article In practice, advantageous use of this method has been made for a long time, for example to produce the uncured tread strips for pneumatic vehicle tires. Since the tread strips should have different properties in the different cross-sectional regions, not only for acceptable incorporation into the tire blank, but also for the use of the finished tire in driving operation, the tread strips generally have to be composed of two or more different elastomeric mixtures. However, the thorough combination of the partial streams in a single extruder head which is common to all of the extruders poses considerable rheological problems which become even worse if the individual flow paths of greatly different lengths, as is the case, for example, for tread strips having a specific mixture formulation for the widely spreadapart narrow edge portions. With known measures, such as coordinating the dimensions of the flow cross-sections with one another, employing flow suppressors, etc., these difficulties cannot be satisfactorily overcome, as a result of which delamination and other irregularities of the finished profiled articles constantly occur. The conditions improve when the third extruder in the known Y-arrangement is placed on the extrusion nozzle counter to the direction of withdrawal. However, the tight fastening of the three extruders together, or even the easily detachable clamping together, for example with the aid of bayonet closures, makes it necessary to have extremely heavy and expensive special constructions for such extruder heads.

In contrast, it is an object of the present invention, for the Y-arrangement of three extruders relative to one another, to provide, with structurally simple means which are consequently inexpensive to produce, a reliably tight and yet easily detachable connection, especially of the third extruder.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
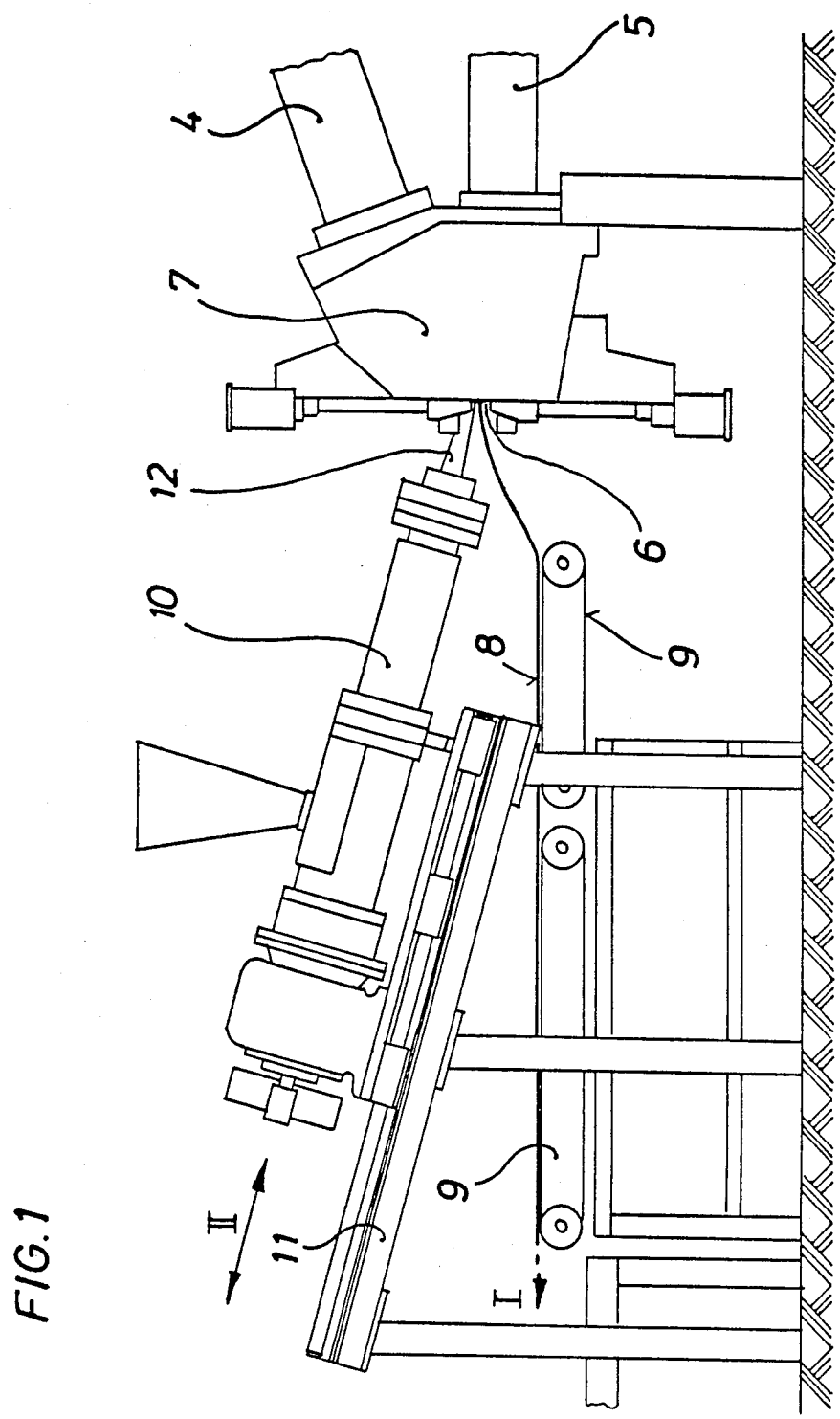
FIG. 1 is a schematic side view showing one inventive embodiment of a triplex unit.

The apparatus of the present invention is characterized primarily in that the third extruder is displaceable in the longitudinal direction relative to the two first extruders, and is tightly placed on the common extrusion nozzle in only a frictionally connecting manner.

Pursuant to one important feature of the present invention, the front surface of the extrusion nozzle, which surface faces away from the two first extruders, may be provided with nipple-like contact parts which form one or more limit stops for the extrusion nozzle of the third extruder; accompanied by a change of direction, the through-bore of the contact part, which is open toward the outside, opens within the common extrusion nozzle toward the shape-providing region thereof. The contact parts are advantageously provided with a spherically curved abutment surface, while the outlet openings of the extrusion nozzle of the third extruder has a spherically curved expansion conforming to the abutment surfaces of the contact parts, or is conically widened to achieve a higher specific surface pressure which is favorable for a sealingly tight contact.

The present invention offers advantageous possibilities in the so-called "triplex-technology". This term refers to an only very recently initiated further development of the duplex units, which up to now have been utilized in producing pneumatic tires, to a triple-extruder system with which composite tread strip profiles of three and possibly even four different rubber mixtures can be extruded in a single operation true to size and without the danger of air pockets. Whereas the heretofore known units of this type are constructed by distributing the three extruders "piggyback" fashion one above the other, or in a radial arrangement in one plane at angular intervals relative to one another, the novel movable arrangement of the third extruder opposite to the "piggyback" arrangement of the two first extruders, makes possible with surprisingly simple structural measures, and without compromising the operational reliability and the reliability of the overall apparatus, extremely short paths for the flow of the mixture fed into the common extrusion nozzle from these extruders; the result, in turn, is particularly favorable conditions for an undisturbed and satisfactory flowing-together of the mixture. Since the third extruder can be elevated above or even below the plane of withdrawal of the profiled articles, it requires no additional floor space, so that the space required for the overall unit is practically no greater than that required for an otherwise customary duplex-unit. Furthermore, no allowances have to be made for obstructions in operation, inaccessibility to the devices which cooperate with the withdrawal, and to the exiting profiled articles themselves. A further result of the inventive arrangement, in conjunction with the longitudinal displaceability of the extruder, is a freer access to the extrusion nozzle, along with the possibility for a simple and rapid conversion if necessary.

For a proper, trouble-free operation of the unit, the absolutely tight placement of the movable third extruder on the common extrusion nozzle is of critical significance. With the novel contact parts, the present invention provides a detachable, direct metal-to-metal connection, which conforms in its function to known grease guns having transition fittings, and which pursuant to all experiences calling for the necessary contact pressures, reliably seals against extremely high flow pressures over long periods of time. The contact parts are expediently disposed in the longitudinal axis of the associated third extruder, and are therefore in all cases placed on the front surface of the common extrusion nozzle at an acute angle relative to the direction of withdrawal of the profiled articles.

Although placing the third extruder above the withdrawal plane is the most advantageous arrangement with regard to the amount of space which is required, it is within the scope of the present invention to longitudinally displaceably dispose the movable third extruder in the withdrawal plane or parallel thereto, and at an acute angle relative to the direction of withdrawal.

DESCRIPTION OF PREFERRED EMBODIMENTS

Referring now to the drawings in detail, the unit illustrated in FIG. 1 contains two screw extruders 4, 5, which are disposed one above the other at an acute angle to form a "piggyback" component. The extruders 4, 5 are provided with non-illustrated feed and drive devices, and convey material toward a common extrusion nozzle 6, which is the termination of the extruder head 7 which connects the two extruders 4, 5. In the assumed application of the unit for producing uncured treads for pneumatic vehicle tires (other applications are, of course, also conceivable, such as the production of composite sealing sections, cable sheathings, hoses, conveyer belts, etc.), the two extruders 4 and 5 supply the various mixtures for the sublayer and for the tread surface of the tread strip, while a third extruder 10 is provided for supplying the particularly readily bondable mixture for the outer edge strips. The finished combined and formed uncured tread strip 8 exits the extrusion nozzle 6 onto a withdrawal mechanism 9, and is removed in the direction of the arrow I for storage or for the further processing of the subsequent tire manufacture.

Figure 2:
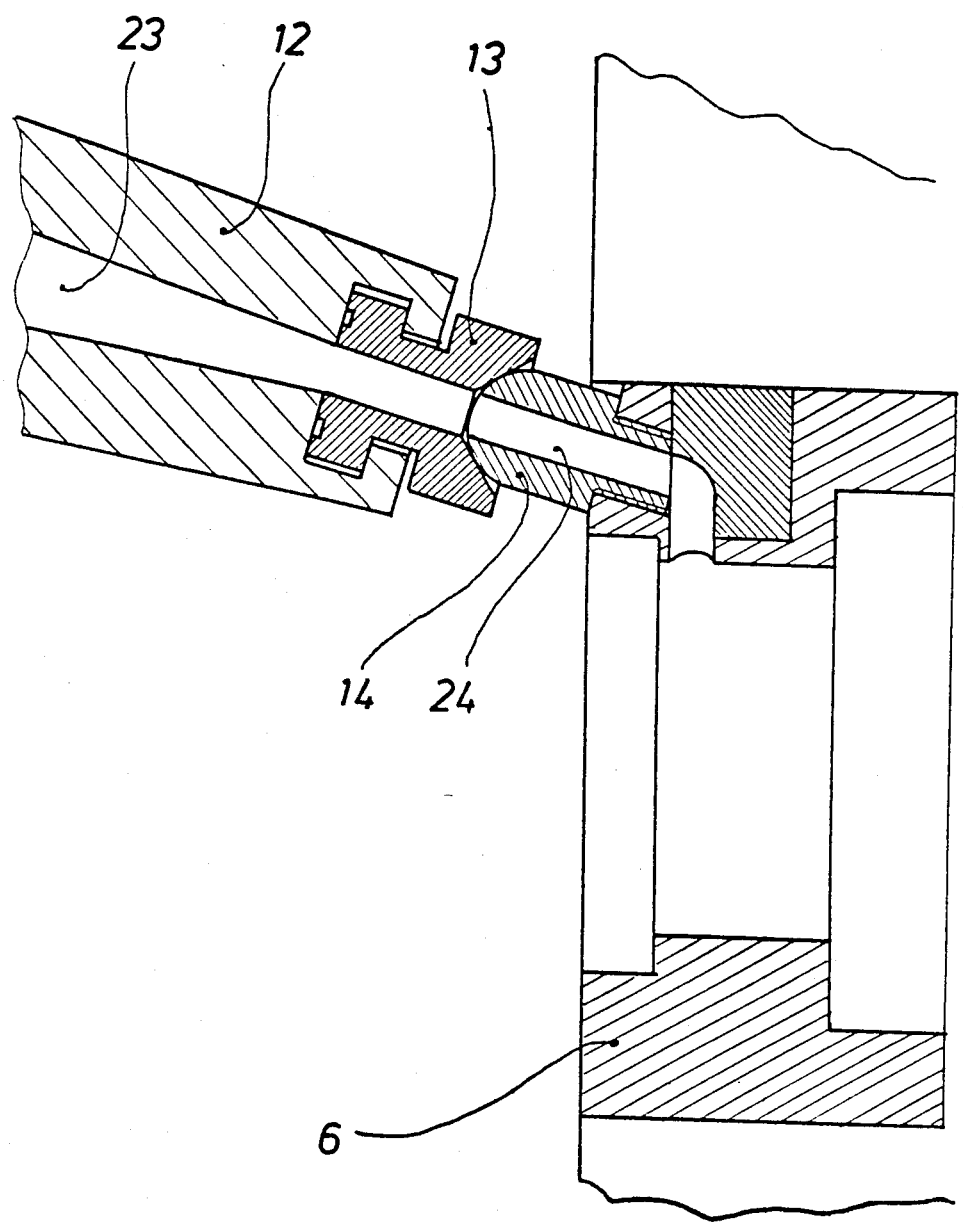
FIG. 2 is an enlarged sectional view of a portion of the unit of FIG. 1.

The third extruder 10 is displaceably arranged, in the direction of the double arrow II, at an incline, above the withdrawal mechanism 9 opposite the two extruders 4, 5 and on an elevated machine frame 11 at an acute angle to the direction of withdrawal (arrow I), so that in the illustrated operating position, the extrusion nozzle 12 of the extruder 10 butts in direct metallic content against the front surface of the extrusion nozzle 6. As can be seen in the detailed sectional view of FIG. 2, the extrusion nozzle 12 carries a conically, outwardly widened insert 13 which, in coaxial alignment, butts against a nipple-like contact part 14 which is disposed in the extrusion nozzle 6 at an angle. The contact part 14 has a spherically curved surface in order to assure a tight contact. The through-bore 24 of the contact part 14 opens, in the radial direction, into the extrusion nozzle 6 directly in the shape-providing exit region thereof. Consequently, the mixture supplied from the extruder 10 is conveyed by the shortest path, through the bore 23 of the extrusion nozzle 12 and of the insert 13, and through the through-bore 24 of the contact part 14, into the extrusion nozzle 6 which is common to all three of the extruders.

Figure 3:
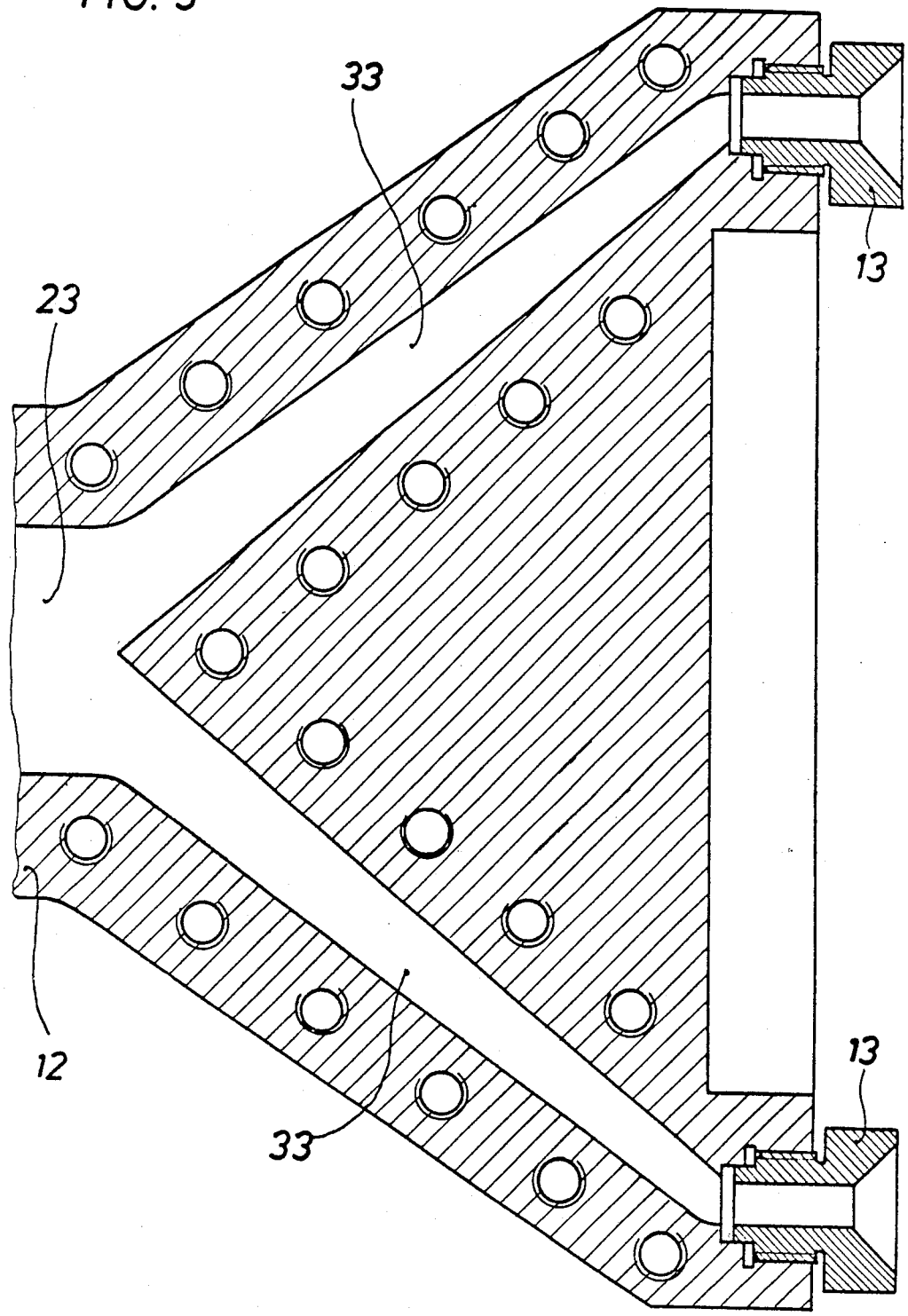
FIG. 3 is a variation of the embodiment illustrated in FIG. 2.

FIG. 3 shows an advantageous variation for supplying the mixture to the relatively widely spread-apart edge portions of the tread strip. In this case, the bore 23 of the extrusion nozzle 12 is branched into two diverging branch bores 33. The spaced-apart inserts 13 are provided as nozzle ends, and are associated in the same manner as previously described with contact parts 14 on the extrusion nozzle 6.

The present invention is, of course, in no way restricted to the specific disclosure of the specification and drawings, but also encompasses any modifications within the scope of the appended claims.

What I claim is:

1. An apparatus for producing, by extrusion, flat profiled articles of highly viscous plastic mixtures of various compositions of rubber or synthetic material employed for vehicle pneumatic vehicle tire tread strip configuration; said apparatus having two first extruders, said two first extruders are disposed at an acute angle from one another and convey said material to a common extrusion nozzle, and a third extruder is placed on a side of said common extrusion nozzle remote from said two extruders and said third extruder conveys said material to said common extrusion nozzle counter to a withdrawal direction of said profiled articles of said apparatus; the improvement therewith which comprises:

said third extruder being movably displaceable in a longitudinal direction relative to said two first extruders, and being tightly placed on said common extrusion nozzle in only a frictionally connecting manner, said third extruder being provided with an extrusion nozzle for placing of said third extruder on said common extrusion nozzle; said side of said common extrusion nozzle remote from said two first extruders being provided with at least one nipple-like contact part, which forms at least one limit stop for said extrusion nozzle of said third extruder; said contact part having a through-bore which is open toward said extrusion nozzle of said third extruder, and, via a change of direction within said common extrusion nozzle, opens towards a shape-providing region of said common extrusion nozzle, said contact part being provided with a spherically curved abutment surface for receiving said extrusion nozzle of said third extruder sealingly in complementary relationship thereagainst, said extrusion nozzle of said third extruder being provided with at least one outlet opening for communicating with said through-bore of said contact part, with said outlet opening being a conically expanding abutment surface, said spherically curved abutment surface exclusively in engagement with said conically expanding abutment surface for overcoming seal problems of said third extruder to achieve a higher specific surface pressure favorable for a sealing tight contact.

2. An apparatus according to claim 1, in which said third extruder is displaceable in a longitudinal direction at an acute angle to said withdrawal direction.

3. An apparatus according to claim 2 in which said contact part is disposed in a longitudinal axis of said third extruder at an acute angle to said withdrawal direction of said profiled articles from said apparatus.

4. An apparatus according to claim 1, in which said third extruder is displaceable in the longitudinal direction at an acute angle relative to said withdrawal direction of said profiled articles from said apparatus.

5. An apparatus according to claim 4, in which said contact part is disposed in a longitudinal axis of said third extruder at an acute angle to said withdrawal direction of said profiled articles from said apparatus.

* * * * *